(12) United States Patent
Xu et al.

(10) Patent No.: US 10,255,352 B1
(45) Date of Patent: Apr. 9, 2019

(54) SOCIAL MEDIA MINING SYSTEM FOR EARLY DETECTION OF CIVIL UNREST EVENTS

(71) Applicant: HRL Laboratories, LLC, Malibu, CA (US)

(72) Inventors: Jiejun Xu, Chino, CA (US); Tsai-Ching Lu, Wynnewood, PA (US); Ryan F. Compton, Los Angeles, CA (US); David L. Allen, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 773 days.

(21) Appl. No.: 14/535,812

(22) Filed: Nov. 7, 2014

Related U.S. Application Data

(63) Continuation-in-part of application No. 14/295,101, filed on Jun. 3, 2014, now Pat. No. 9,953,080, which is a continuation-in-part of application No. 14/210,265, filed on Mar. 13, 2014, now Pat. No. 9,794,358.

(60) Provisional application No. 61/831,058, filed on Jun. 4, 2013, provisional application No. 61/809,160, filed on Apr. 5, 2013, provisional application No. 61/903,639, filed on Nov. 13, 2013.

(51) Int. Cl.
*G06N 5/04* (2006.01)
*G06F 17/30* (2006.01)

(52) U.S. Cl.
CPC ......... *G06F 17/30699* (2013.01); *G06N 5/04* (2013.01)

(58) Field of Classification Search
CPC ....................................... G06N 5/04
USPC ......................................................... 706/45
See application file for complete search history.

(56) References Cited

U.S. PATENT DOCUMENTS

| | | |
|---|---|---|
| 2007/0203644 A1 | 8/2007 | Thota et al. |
| 2008/0288326 A1 | 11/2008 | Abramowicz |
| 2008/0319558 A1 | 12/2008 | Resende |
| 2011/0125826 A1 | 5/2011 | Erhart et al. |
| 2012/0330721 A1 | 12/2012 | Volpe et al. |
| 2013/0073336 A1 | 3/2013 | Heath |

(Continued)

FOREIGN PATENT DOCUMENTS

| | | |
|---|---|---|
| CN | 102088419 | 6/2011 |
| CN | 102577494 | 7/2012 |
| CN | 102883259 | 1/2013 |

OTHER PUBLICATIONS

Boettcher ("EventRadar: A Real-Time Local Event Detection Scheme Using Twitter Stream" 2012).*

(Continued)

*Primary Examiner* — Lut Wong
(74) *Attorney, Agent, or Firm* — Tope-McKay & Associates

(57) ABSTRACT

Described is a system for early detection of events via social media mining. The system receives, as input, social media blog posts comprising textual data. The system processes the social media blog posts through a cascade of filters. The cascade of filters comprises an event term detection filter, a location term detection filter following the event term detection filter, and a future date detection filter following the location term detection filter. A plurality of candidate social media blog posts describing an event of interest on a future date is output to a user for further analysis.

13 Claims, 7 Drawing Sheets

(56) References Cited

U.S. PATENT DOCUMENTS

| | | |
|---|---|---|
| 2013/0073995 A1 | 3/2013 | Piantino et al. |
| 2013/0218965 A1 | 8/2013 | Abrol |
| 2014/0141808 A1 | 5/2014 | Deng |
| 2015/0227851 A1* | 8/2015 | Kaisser .............. G06N 99/005 706/12 |

OTHER PUBLICATIONS

Watanabe ("Jasmine: A Real-time Local-event Detection System based on Geolocation Information Propagated to Microblogs" 2011).*
De Silva, Lalindra, and Ellen Riloff. "User Type Ciassification of Tweets with Implications for Event Recognition." Proceedings of the Joint Workshop on Social Dynamics and Personal Attributes in Social Media, pp. 98-108, Baltimore, Maryland USA, Jun. 27, 2014, 2014 Association for Computational Linguistics.
X. Zhu and Z. Ghahramani, "Learning from labeled and unlabeled data with label propagation," Technical Report CMU-CALD-02-107, Carnegie. Mellon University, Tech. Rep., 2002.
Vincenty, Thaddeus, "Direct and inverse solutions of geodesics on the ellipsoid with application of nested equations," Survey Review 23.176 (1975): 88-93.
Vardi and Zhang, "The multivariate L1-median and associated data depth," Proceedings of the National Academy of Sciences, 97(4): 1423-6, 2000.
Compton et al., "Detecting future social unrest in unprocessed Twitter Data," IEEE Intelligence and Security Informatics, Jun. 4-7, 2013.
H. Kwak, C. Lee, H. Park, and S. Moon, "What is twitter, a social network or a news media?" WWW 2010, Apr. 26-30, 2010.
D. Jurgens, "That's what friends are for: Inferring location in online communties based on social relationships," ICWSM, Proceedings of the Seventh International AAAI Conference on Weblogs and Social Media, 2013, pp. 273-282.
H. Achrekar, A. Gandhe, R. Lazarus, S. H. Yu, and B. Liu, "Predicting flu trends using twitter data,"in Computer Communications Worshops (INFOCOM WKSHPS), 2011 IEEE Conference on. IEEE, 2011, pp. 702-707.
M. Paul and M. Dredze, "You are what you tweet: Analyzing twitter for public health," in Fifth Internatonal AAAI Conference on Weblogs and Social Media (ICWSM 2011), Proceedings of the Fifth International AAAI Conference on Weblogs and Social Media, 2011, pp. 265-272.
D. Mocanu, A. Baronchelli, N. Perra, B. Gonalves, Q. Zhang, and A. Vespignani, "The twitter of babel: Mapping world languages through micrologging platforms," PLoS ONE, vol. 8, No. 4, p. e61981. Apr. 2013, pp. 1-9.
A. Tumasjan, T. O. Sprenger, P. G. Sandner, and I. M. Welpe, "Predicting elections with twitter: What 140 characters reveal about political sentiment," in Proceedings of the fourth international AAAI conference on weblogs and social media, 2010, pp. 178-185.
R. Compton, C. Lee, T.-C. Lu, L. D. Silva, and M. Macy, "Detecting future unrest in unprocessed twitter data," in IEEE Intelligence and Security Informatics (ISI), 2013, pp. 56-60.
B. Mandel, A. Culotta, J. Boulahanis, D. Stark, B. Lewis, and J. Rodrigue, "A demographic analysis of online sentiment during hurricanem irene," in Proceedings of the Second Workshop on Language in Social Media. Association for Computational Linguistic, 2012, pp. 27-36.
h t p : / / thenextweb.com/2010/01/15/Twitter-geofall-023-tweets-geotagged, taken on Nov. 4, 2014.
J. Mahmud, J. Nichols, and C. Drews, "Where is this tweet from? inferring home locations of twitter users," Proc AAAI ICWSM, Proceedings of the Sixth International AAAI Conference on Weblogs and Social Media, vol. 12, 2012, pp. 511-514.
Y. Takhteyev, A. Gruzd, and B. Wellman, "Geography of twitter networks," Social Networks, vol. 34, No. 1, pp. 73-81, 2012.
D. Mok, B. Wellman, and J. Carrasco, "Does distance matter in the age of the internet?" Urban Studies, vol. 47, No. 13, pp. 2747-2783, 2010.
J. Goldenberg and M. Levy, "Distance is not dead: Social interaction and geographical distance in the internet era," ar-Xiv preprint arXiv:0906.3202. 2009, pp. 1-22.
X. Bresson, T. Laurent, D. Uminsky, and J. H. von Broch, "Convergence and energy landscape for cheeger cut clustering," Part of: Advances is Neural Information Processing System 25 (NIPS 2012), pp. 1394-1402.
A. Szlam and X. Bresson, "Total variation and cheegar cuts," Proceedings of the 27th International Conference on Machine Learning, pp. 1039-1040, 2010.
L. Rudin, S. Osher, and E. Faterni, "Nonlinear total variation based noise removal algorithms," Physica D: Nonlinear Phenomena, vol. 60, No. 1-4, pp. 259-268, Nov. 1992.
Granoveltter, Mark S. "The Strength of Weak Ties," American Journal of Sociology, vol. 78, No. 6 (May 1973), pp. 1360-1380.
Y. Vardi and C.-H. Zhang. "The multivariate I1-median and associated data depth," Proceedings of the National Academy of Sciences, vol. 97, No. 4, pp. 1423-1426, 2000.
E. Candes, J. Romberg. and T. Tao, "Stable Signal Recovery from Incomplete and Inaccurate Measurements arXiv : math / 0503066v2 [ math , NA ] Dec. 7, 2005," Science. vol. 40698, pp. 1-15, 2005.
A. Szlam and X. Bresson, "A total variation-based graph clustering algorithm for cheeger ratio cuts," Citeseer, 2010, pp. 1-12.
T. Goldstein and S. Osher. "The Split Bregman Method for L1-Rgularized Problems," SIAM Journal on Imaging Sciences, vol. 2, No. 2, pp. 323-343, 2009.
P. Getreuer, "Total Variation Inspriring using Split Bregman," Image Processing On Line, 2 (2012), pp. 147-157.
L.M. Smith, M. S. Keegan, T. Wittman, G. O. Mohler, and A. L. Bertozzi, "Improving density estimation by incorporating spatial information," EURASIP J. Adv. Signal Process. vol. 2010, pp. 7:1-7:12. Feb. 2010.
T. Goldstein, X. Bresson and S. Osher, "Geometric Applications of the Split Bregman Method: Segmentation and Surface Reconstruction," Journal of Scientific Computing, vol. 45, No. 1-3, pp. 272-293, Nov. 2009.
A. Chambolle, "An algorithm for total variation Minimization and applications," Journal of Mathematical imaging and vision, vol. 20, No. 1-2, pp. 89-97, 2004.
M. Zhu and T. Chan, "An efficient primal-dual hybrid gradient algorithm for total variation image restoration," UCLA CAM Report, pp. 08-34, 2008.
C.-J. Hsieh, K.-W. Chang, C.-J. Lin, S. S. Keerthi, and S. Sundararajan, "A dual coordinate descent method for large-scale linear svm," in Proceedings of the 25th international conference on Machine learning, ACM, 2008, pp. 408-415.
Y. Li and S. Osher, "Coordinate descent optimization for 1 minimization with application to compressed sensing: a greedy algorithm," Inverse Probl. Imaging, vol. 3, pp. 487-503, 2009.
J. K. Bradley, A. Kyrola, D. Bickson, and C. Guestrin, "Parallel coordinate descent for L1-regularized loss minimization," in International Conference on Machine Learning (ICML 2011), Bellevue, Washington, Jun. 2011, arXiv:1105.5379, pp. 1-8.
P. Richt'arik and M. Tak'a'c, "Parallel coordinate descent methods for big data optimization," arXiv.1212.0873, 2012, pp. 1-43.
C. Scherrer, A. Tewari, M. Halappanavar, and D. Haglin, "Feature clustering for accelering parallel coordinate descent," Advances in Neural Information Processing Systems 25, pp. 28-36, arXiv:1212.4174, 2012.
P. Richt'arik and M. Tak'a'c, "Efficient serial and parael coordinate descent methods for huge-scale truss toplogy design," Operations Research Proceedings 2011. Springer, 2012, pp. 27-32.
Rousseeuw, Peter J., and Christophe Croux. "Alternatives to the median absolute deviation." Journal of the American Statistical Association 88.424 (1993), pp. 1273-1283.
Ryan Compton, David Jurgens, David Allen, "Geotagging One Hundred Million Twitter Accounts with Total Variation Minimization," arXiv preprint arXiv:1404.7152, (2014), pp. 1-9.
Cheng, Z.; Caverlee, J.; and Lee, K. (2010) You are where you tweet: a content-based approach to geo-locating twitter users, In

(56) References Cited

OTHER PUBLICATIONS

Proceedings of the 19th ACM international conference on Information and knowledge management, 759-768. ACM.
Davis Jr, C.; Pappas G.; de Oliveira; D.; and de L Arcanjo, F. (2011) Inferring the location of twitter messages based on user relationships. Transactions in GIS 15(6):735-751.
Goldenberg, J., and Levy, M. (2009) Distance is not dead: Social interaction and geographical distance in the internet era. arXiv preprint arXiv:0906.3202.
Hecht, B.; Hong, L.; Suh, B.; and Chi, E. (2011) Tweets from justin bieber's 'heart: the dynamics of the location field in user profiles. In Proceedings of the 2011 annual conference on Human factors in computing systems, 237-246, ACM.
Ikawa, Y.; Enoki, M.; and Tatsubori, M. (2012) Location inference using microblog messages. In Proceedings of the 21st international conference companion on World Wide Web, 687-690. ACM.
Mahmud, J.; Nichols, J.; and Drews, C. (2012) Where is this tweet from? inferring home locations of twitter users. Proc AAAI ICWSM 12.
Mok, D.; Wellman, B.; and Carrasco, J. (2010) Does distance matter in the age of the Internet? Urban Studies 47 (13):2747-2783.
Pontes, T.; Vasconcelos, M.; Almeida, J.; Kumaraguru, P.; and Almeida, V. (2012) We know where you live: Privacy characterization of foursquare behavior. In UbiComp '12.
Sadilek, A.; Kautz,, H.; and Bigham, J. (2012) Finding your friends and following them to where you are. In Proceedings of the fifth ACM international conference on Web search and data mining, 723-732. ACM.
Zhu, Xiaojin, and Zoubin Ghahramani. Learning from labeled and unlabeled data with label propagation. Technical Report CMU-CALD-02-107, Carnegie Mellon University, (2002).
Ronkainen, Oja, and Orponen. (2003). Computation of the multivariate Oja median. Developments in Robust Statistics, 344-359. http://users.ics.aalto.fi/orponen/papers/ojamed.pdf.
Vardi and Zhang. (2000). The multivariate L1-median and associated data depth. Proceedings of the National Academy of Sciences. 97(4): 1423-6. http://www.pnas.org/content/97/4/1423.full.pdf.
https://www.tumblr.com/about downloaded Dec. 2014.
http://gnip.com/tumblr/ downloaded Dec. 2014.
Ryan Compton, Craig Lee, Tsai-Ching Lu, Latindra De Silva, Michael Macy, "Detecting Future Social Unrest in Unprocessed Twitter Data", IEEE International Conference on Intelligence and Security Informatics (ISI), 2013, pp. 56-60.
Sandra Gonzalez-Bailon, Javier Borge-Holthoefer, Alejandro Rivero, Yamir Mareno, "The Dynamics of Protest Recruitment through an Online Network", Nature Scientific Reports; vol. 1. Article 197, Dec. 2011, doi:10.1038/srep00197.
Ekaterina Stepanova, "The Role of Information Communication Technologies in the 'Arab Sping'", PONARS Eurasia Policy Memo No. 159, 2011.
F. Chen, J. Arredondo, R. P. Khandpur, C.-T. Lu, D. Mares, D. Gupta, and N. Ramakrishnan, "Spatial surragates to forecast social mobilization and civil unrests," Position Paper in CCC Workshop on "From GPS and Virtual Globes to Spatial Computing", 2012.
Ting Hua, Feng Cheng Liang Zhao, Chang-Tien Lu, Naren Ramakrishnan, "STED: Semi-Supervised Targeted Event Detection", KDD '13 Proceedings of the 19th ACM SIGKDD international conference on Knowledge discovery and data mining, pp. 1466-1469.
David Jurgens, "That's what friends are for: inferring location in online social media platforms based on social relationships", Proceedings of the Seventh International AAAI Conference on Weblogs and Social Media, ICWSM 2013.
Colbaugh, R,. Glass, K., "Early Warning Analysis for Social Diffusion Events", IEEE International Conference on Intelligence and Security Informatics, (ISI), 2010, pp. 37-42.
Weng, J., Yao, Y., Leonardi, E., Lee, F., "Event Detection in Twitter", International Conference on Weblogs and Social Media, 2011.
Weerkamp, W., De Rijke, M., "Activity Prediction: A Twitter-base Exploration", SIGIR Workshop on Time-aware Information Access, 2012.
Xu, J., et al., "Civil Unrest Prediction: A Tumblr-Based Exploration," Social Computing, Behavioral-Cultural Modeling and Prediction Lecture Notes in Computer Science vol. 8393, 2014, pp. 403-411.
Office Action 1 for U.S. Appl. No. 14/539,828, dated Dec. 16, 2016.
Response to Office Action 1 for U.S. Appl. No. 14/539,828, dated Mar. 16, 2017.
Office Action 2 for U.S. Appl. No. 14/539,828, dated Jun. 23, 2017.
Office Action 1 for U.S. Appl. No. 14/295,101, dated Sep. 7, 2016.
Abel et al., Semantics+ Filtering+ Search= Twitcident Exploring Information in Social Web Streams, 2012.
Response to Office Action 2 for U.S. Appl. No. 14/295,101, dated Dec. 7, 2016.
Office Action 2 for U.S. Appl. No. 14/295,101, dated Feb. 16, 2017.
Response to Office Action 2 for U.S. Appl. No. 14/295,101, dated May 16, 2017.
Office Action 1 for U.S. Appl. No. 14/210,265, dated Mar. 31, 2016.
Response to Office Action 1 for U.S. Appl. No. 14/210,265, dated Jun. 30, 2016.
Lars Backstrom et al., Find Me If You Can: Improving Geographical Prediction with Social and Spatial Proximity, Apr. 26-30, 2010, World Wide Web Conference Committee, 2010, pp. 1-10.
Clodoveu Davis Jr et al., Inferring the Location of Twitter Messages Based on User Relationships, Nov. 22, 2011, Transactions in GIS, 15, pp. 735-751.
Office Action 2 for U.S. Appl. No. 14/210,265, dated Oct. 21, 2016.
Response to Office Action 2 for U.S. Appl. No. 14/210,265, dated Jan. 23, 2017.
Communication regarding European Search Report and the European Search Opinion for European Regional Phase Patent Application No. 14780262.3, dated Oct. 13, 2016.
Search strategy in the European Search for European Regional Phase Patent Application No. 14780262.3, dated Oct. 13, 2016.
Search Report in the European Search for European Regional Phase Patent Application No. 14780262.3, dated Oct. 13, 2016.
Search Opinion for European Regional Phase Patent Application No. 14780262.3, dated Oct. 13, 2016.
Lars Backstrom et al: "Find me if you can," Proceedings of the 19th International Conference on World Wide Web. WWW '10. Jan. 1, 2010 (Jan. 1, 2010). XP055188728. New York. New York. USA, pp. 51-69.
Tatiana Pontes et al: "Beware of What You Share: Inferring Home Location in Social Networks." Data Mining Workshops (ICDMW). 2012 IEEE 12th International Conference on. IEEE. Dec. 10, 2012 (Dec. 10, 2012). pp. 571-578. XP032303104.
Clodoveu A. Davis Jr. et al: "Inferring the Location of Twitter Messages Based on User Relationships." Transactions in GIS. vol. 15. No. 6. Dec. 22, 2011 (Dec. 22, 2011). pp. 735-751. XP055305589. GB.
David Jurgens: "That's What Friends are for: Inferring Location in Online Social Media Platforms Based on Social Relationships,"Jun. 27, 2013 (2013). pp. 273-282. XP055307355. Retrieved from the Internet: URL:http://www.aaai.orgjocsjindex.php/ICWS M/ICWSM13/paperjviewFile/6067/6366 [retrieved on Oct. 4, 2016].
PCT International Search Report and the Written Opinion of the International Searching Authority for PCT/US2014/026846, dated Jul. 14, 2014.
Cheng, Z., et al., "You are where you tweet: a content-based approach to geo-locating twitter users," In Proceedings of the 19th ACM international conference on Information and knowledge management, 2010, pp. 759-768.
Notice of Allowance for U.S. Appl. No. 14/210,265, dated Jun. 8, 2017.
Response to Office Action 2 for U.S. Appl. No. 14/539,828, dated Sep. 25, 2017.
Office Action 3 for U.S. Appl. No. 14/539,828, dated Nov. 14, 2017.
Office Action 1 for Chinese Application No. 201480020049.1, dated May 12, 2017.
Response to Office Action 1 for Chinese Application No. 201480020049.1, dated Sep. 4, 2017.

(56) References Cited

OTHER PUBLICATIONS

Notice of Allowance for Chinese Application No. 201480020049.1, dated Oct. 30, 2017.
Response to the European Search Report and the European Search Opinion for European Regional Phase Patent Application No. 14780262.3, dated Aug. 29, 2017.
International Preliminary Report on Patentability for PCT/US2014/026846; dated Oct. 15, 2015.
Office Action 3 for U.S. Appl. No. 14/295,101, dated Jul. 10, 2017.
Response to Office Action 3 for U.S. Appl. No. 14/295,101, dated Oct. 10, 2017
Response to Office Action 3 for U.S. Appl. No. 14/539,828, dated Feb. 14, 2018.
Office Action 4 for U.S. Appl. No. 14/535,828, dated Jun. 20, 2018.
Response to Office Action 4 for U.S. Appl. No. 14/539,828, dated Sep. 20, 2018.
Notice of Allowance for U.S. Appl. No. 14/295,101, dated Dec. 18, 2017.

\* cited by examiner

| | # detected posts | % posts matched to GSR | # unique posts (no reblogs) | % unique posts matched to GSR | # matched posts from event date | # matched Posts with 1+ day lead | # distinct GSR events covered |
|---|---|---|---|---|---|---|---|
| April | 210 | 96 % | 80 | 91% | 48 | 25 | 29 |
| May | 198 | 74 % | 56 | 79 % | 28 | 16 | 14 |

SOCIAL MEDIA MINING SYSTEM FOR EARLY DETECTION OF CIVIL UNREST EVENTS

CROSS-REFERENCE TO RELATED APPLICATIONS

This is a Continuation-in-Part application of U.S. Non-Provisional application Ser. No. 14/295,101, filed in the United States on Jun. 3, 2014, entitled, "Social Media Data Mining for Early Detection of Newsworthy Civil Unrest Events," which is a Non-Provisional patent application of U.S. Provisional Application No. 61/831,058, filed in the United States on Jun. 4, 2013, entitled, "Social Media Data Mining for Early Detection of Newsworthy Civil Unrest Events."

U.S. Non-Provisional application Ser. No. 14/295,101 is a Continuation-in-Part application of U.S. Non-Provisional application Ser. No. 14/210,265, filed in the United States on Mar. 13, 2014, entitled, "Inferring the Location of Users in Online Social Media Platforms Using Social Network Analysis," which is a Non-Provisional patent application of U.S. Provisional Application No. 61/809,160, filed in the United States on Apr. 5, 2013, entitled, "Inferring the Location of Users in Online Social Media Platforms Using Social Network Analysis."

This is ALSO a Non-Provisional patent application of U.S. Provisional Application No. 61/903,639, filed in the United States on Nov. 13, 2013, entitled, "A Social Media Mining System for Early Detection of Civil Unrest Events."

GOVERNMENT LICENSE RIGHTS

This invention was made with government support under U.S. Government Contract Number D12PC00285. The government has certain rights in the invention.

FIELD OF INVENTION

The present invention relates to a system for early detection of events and, more particularly, to a system for early detection of events via social media mining.

BACKGROUND OF THE INVENTION

The prevalence of social media (e.g., micro-blogging platforms such as Twitter™ and Tumblr™) allows users to share messages and interact with potentially anyone in the world. In general, social media users post blogs about things or activities they did in the past and, more importantly, things or activities they plan to do in the near future. For instance, it has been shown that Twitter™ served an important role in terms of organizing and planning events during the Arab Spring, which is a sequence of protests that swept through the Middle East in early 2011 (see the List of Incorporated Cited Literature References, Literature Reference No. 2).

Traditionally, civil unrest events are predicted by intelligence services which generally need to place their agents in different regions of the world for risk assessment. This could introduce significant delays on the report of the events. Furthermore, it is incredibly difficult (if not impossible) to have human analysts monitor all regions of the world at the same time. The value of civil unrest forecasting has recently attracted attention from research communities across a wide range of disciplines. Several studies have been conducted for this application. For example, in Literature Reference No. 7, a stochastic hybrid dynamical system (S-HDS) model is proposed to generate predictions for social phenomena. In Literature Reference Nos. 8 and 9, effective keyword based approaches are proposed to detect emerging popular events using publicly available Twitter™ data. Gonzalez-Bailon et al. (Literature Reference No. 1) examined the connection between online discussion and the diffusion of protests. Through the analysis of the recruitment patterns of blogging data, connections between online network, social contagion, and collective dynamics were found. In Literature Reference No. 2, the role of modern information communication technologies in the 2011 Egyptian protests was studied. The work showed that the sociopolitical protests were facilitated by social media networks, particularly in regard to their organizational and communication aspects, and social network played an important role in the rapid disintegration of two regimes, Tunisia and Egypt. Chen et al. (see Literature Reference No. 3) took the next step to propose an approach based on spatial surrogates modeling to forecast social mobilization and civil unrests. Specifically, they define a dictionary of key terms related to protests and apply a statistical model to identify future civil unrest regions and their potential magnitudes.

In a subsequent work (see Literature Reference No. 4), a semi-supervised system was proposed to help users automatically detect and interactively visualize events of a targeted type from Twitter™, such as crimes, civil unrests, and disease outbreaks. Their model first applied transfer learning and label propagation to automatically generate labeled data, then learned a customized text classifier based on mini-clustering. Finally, their model applied fast spatial scan statistics to estimate the locations of events. A similar work was performed by Compton et al. (see Literature Reference No. 5) for civil unrest forecasting using Twitter™ data using domain keywords.

Thus, a continuing need exists for an automatic civil unrest detection system that mines social media data comprising blog posts using simple domain keywords.

SUMMARY OF THE INVENTION

The present invention relates to a system for early detection of events and, more particularly, to a system for early detection of events via social media mining. The system comprises one or more processors and a memory having instructions such that when the instructions are executed, the one or more processors perform multiple operations. The system receives, as input, a plurality of social media blog posts comprising textual data and processes the plurality of social media blog posts through a cascade of filters. The cascade of filters comprises an event term detection filter, a location term detection filter following the event term detection filter, and a future date detection filter following the location term detection filter. A plurality of candidate social media blog posts describing an event of interest on a future date is output to a user for further analysis.

In another aspect, a set of user-defined keywords is used for the event term detection filter to match textual data in the plurality of social media blog posts with the set of user-defined keywords.

In another aspect, a set of user-defined location terms is used for the location term detection filter to match textual data in the plurality of social media blog posts with the set of user-defined location terms.

In another aspect, the system searches the textual data for month terms, resulting in a set of social media blog posts comprising month terms. The system then searches the set of social media blog posts comprising month terms for numbers less than 31, resulting in set of social media blog posts comprising day terms. Then, the system searches each social media blog post in the set of social media blog posts comprising day terms for a year which minimizes a number of days between a date mentioned in the social media blog post and a published date of the social media blog post, resulting in a set of social media blog posts comprising date terms. The system then verifies that the date terms occur after the published dates of the social media blog post.

In another aspect, at least one of the event term detection filter, the location term detection filter, and the future date detection filter is customized to adjust the number of the plurality of candidate social media blog posts describing the event of interest on the future date.

In another aspect, the present invention comprises a cascade of filters for early detection of events via social media mining, the cascade of filters comprises a first event term detection filter; a second location term detection filter following the first event term detection filter; and a third future date detection filter following the second location term detection filter. The cascade of filters receives, as input, a plurality of social media blog posts comprising textual data. The cascade of filters sequentially processes the plurality of social media blog posts. The cascade of filters outputs a plurality of candidate social media blog posts describing an event of interest on a future date to a user for further analysis. The cascade of filters are implemented as computer-readable instructions stored on a non-transitory computer-readable medium that are executable by a computer having a processor.

In another aspect, the present invention also comprises a method for causing a processor to perform the operations described herein.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 6 is an illustration of civil unrest detection results according to the principles of the present invention;

DETAILED DESCRIPTION

Figure 1:
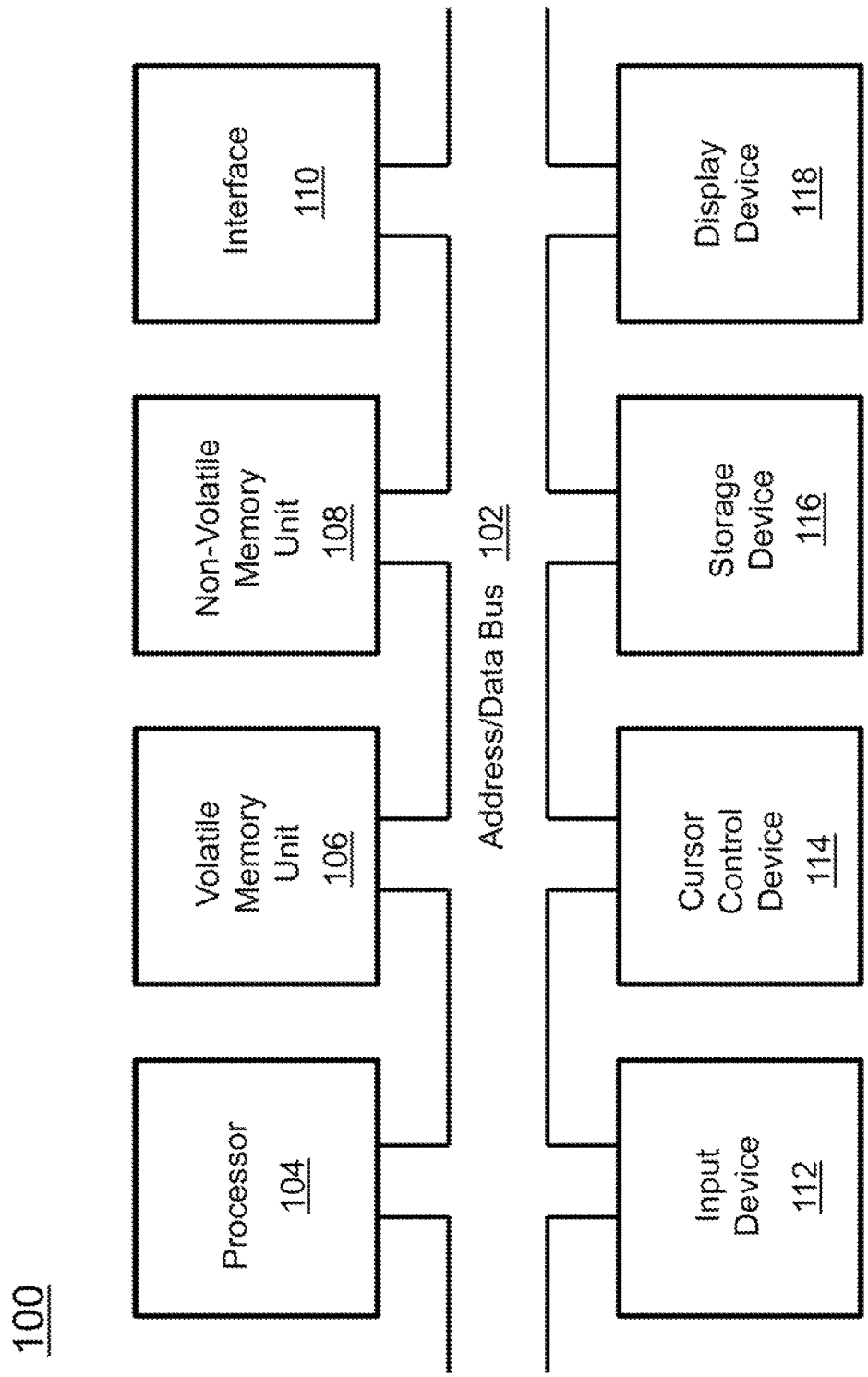
FIG. 1 is a block diagram depicting the components of a system for early detection of events through social media mining according to the principles of the present invention.

The present invention relates to a system for early detection of events and, more particularly, to a system for early detection of events via social media mining. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of the present invention is provided. Finally, specific details of the present invention are provided to give an understanding of the specific aspects.

(1) LIST OF INCORPORATED CITED LITERATURE REFERENCES

The following references are cited throughout this application. For clarity and convenience, the references are listed herein as a central resource for the reader. The following references are hereby incorporated by reference as though fully included herein. The references are cited in the application by referring to the corresponding literature reference number, as follows:

1. Sandra Gonzalez-Bailon, Javier Borge-Holthoefer, Alejandro Rivero, Yamir Mareno, "The Dynamics of Protest Recruitment through an Online Network", Nature Scientific Reports, Vol. 1, Article 197, December 2011.
2. Ekaterina Stepanova, "The Role of Information Communication Technologies in the 'Arab Spring'", PONARS Eurasia Policy Memo No. 159, 2011.
3. F. Chen, J. Arredondo, R. P. Khandpur, C.-T. Lu, D. Mares, D. Gupta, and N. Ramakrishnan, "Spatial surrogates to forecast social mobilization and civil unrests," Position Paper in CCC Workshop on "From GPS and Virtual Globes to Spatial Computing", 2012.
4. Ting Hua, Feng Cheng, Liang Zhao, Chang-Tien Lu, Naren Ramakrishnan, "STED: Semi-Supervised Targeted Event Detection", KDD, 2013.
5. Ryan Compton, Craig Lee, Tsai-Ching Lu, Lalindra De Silva, Michael Macy, "Detecting Future Social Unrest in Unprocessed Twitter Data", IEEE Intelligence and Security Informatics, Jun. 4-7, 2013.
6. David Jurgens, "That's what friends are for: inferring location in online social media platforms based on social relationships", ICWSM 2013.
7. Colbaugh, R., Glass, K., "Early Warning Analysis for Social Diffusion Events", International Conference on Intelligence and Security Informatics, 2010.
8. Weng, J., Yao, Y., Leonardi, E., Lee, F., "Event Detection in Twitter", International Conference on Weblogs and Social Media, 2011.
9. Weerkamp, W., De Rijke, M., "Activity Prediction: A Twitter-based Exploration", SIGIR Workshop on Time-aware Information Access, 2012.

(2) PRINCIPAL ASPECTS

The present invention has three "principal" aspects. The first is a system for early detection of events via social media mining. The system is typically in the form of a computer system operating software or in the form of a "hard-coded" instruction set. This system may be incorporated into a wide variety of devices that provide different functionalities, such as a robot or other device. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
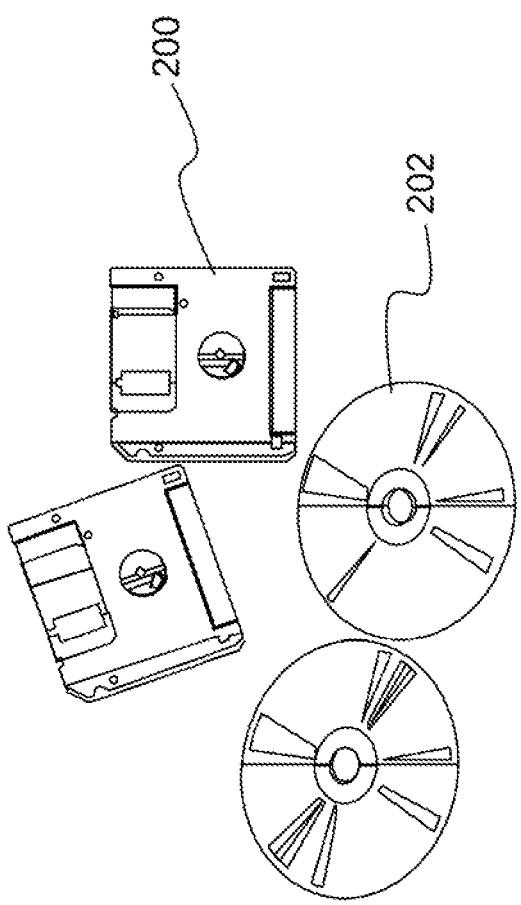
FIG. 2 is an illustration of a computer program product according to the principles of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) INTRODUCTION

Micro-blogging, which is a form of social media, has been growing rapidly in recent years. It provides a convenient mechanism for users to report and share messages with potentially anyone in the world. In a typical scenario, users post messages about what they did, what they are currently doing, or, more interestingly, what they are going to do in the (near) future. The study and monitoring of micro-blogging platforms for detecting civil unrest event has many applications, such as crisis management and decision making.

Consider an application of civil unrest event monitoring in crisis management. When a potential violent strike is organized, online posts regarding the event are likely to be spread on various micro-blogging platforms. By mining these posts, different aspects of the strike, such as when and where the event is going to happen, who will be involved, and what is the target of the strike, can be determined. Early detection of such an event would provide a critical time window to the government to make the right response and minimize loss. Similarly, it provides timely warnings to the general public for their safety.

For the purposes of this application, the Tumblr™ micro-blogging platform is used as a non-limiting example of a social media platform, and civil unrest event detection is the detection focus. However, the invention is applicable to detecting different types of social events and movements from a wide variety of social media platforms. Thus, although the term Tumblr™ may be used, it should be understood that the term is used for convenience and illustrative purposes only and that the invention is not intended to be limited thereto as any other platform can be used interchangeably in place of the Tumblr™ platform. According to the statistics reported on Tumblr™, there are about 133 million users registered for this social networking service. Since its debut in 2007, a total of 59.4 billion posts have been generated. On average, more than 80 million posts are generated every day. As a result, a large amount of data is spread over social networks, which provides information or clues for virtually any major social movements in the world. In addition, Tumblr™ is most popular among younger social media users who are the main force of social movements and civil unrest events in general. Furthermore, Tumblr™ supports multimedia content in blogs, including images, videos, and music. The multimedia content can potentially reveal more details regarding targeted events. A typical Tumblr™ post may describe a future protest event with an attached map revealing the planned route for the protest. The aforementioned factors make Tumblr™ an ideal channel to monitor and forecast civil unrest events.

(4) SPECIFIC DETAILS OF THE INVENTION

Figure 3:
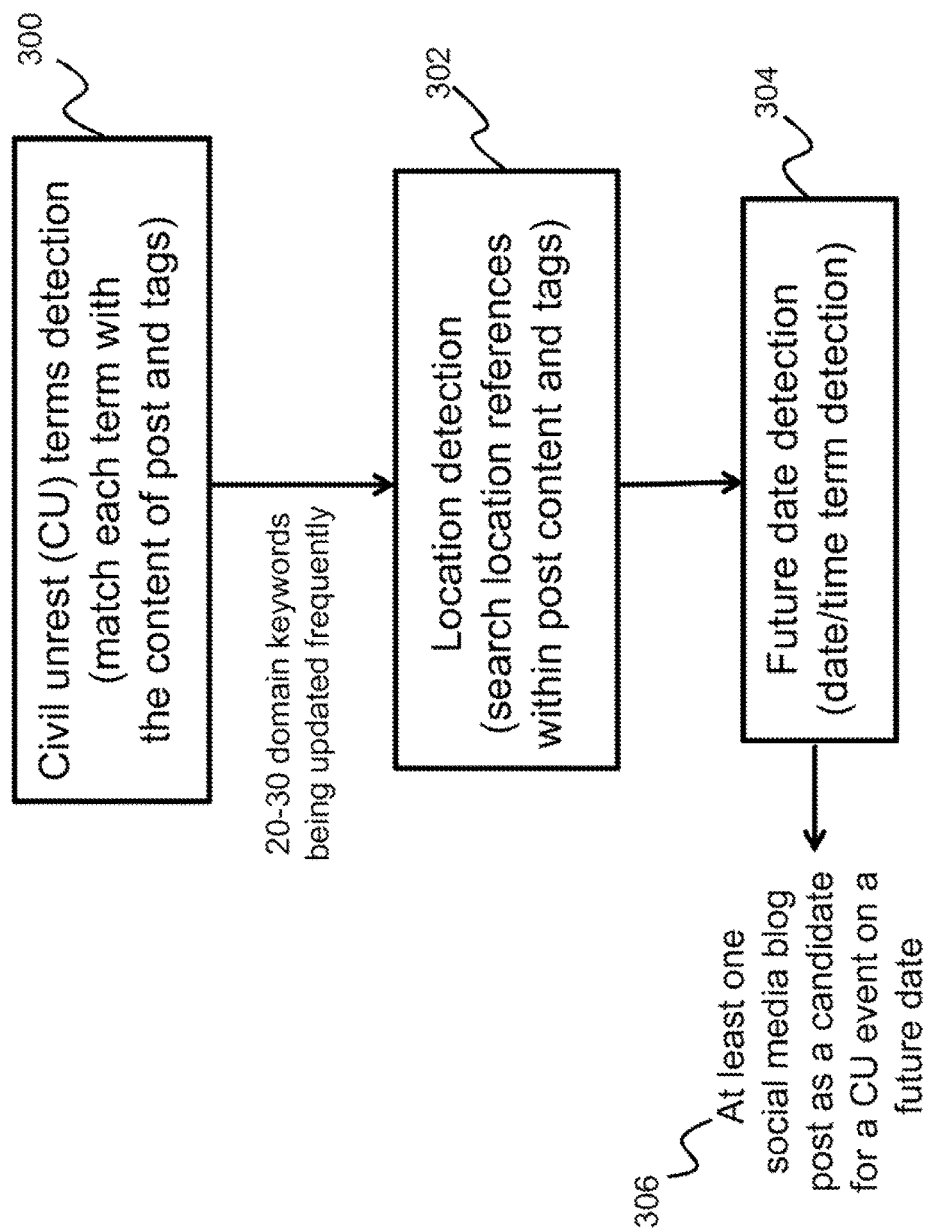
FIG. 3 is a flow diagram illustrating a system for early detection of events through social media mining according to the principles of the present invention.

FIG. 3 depicts the overall workflow of civil unrest detection according to the principles of the present invention. Essentially, the system comprises a cascade of filters which is used to continually monitor and detect civil unrest events from large data streams. There are three main components/filters in the detection process. Given a massive collection of Tumblr™ posts, in a first filter 300 (i.e., keyword filter), the system searches the content of the posts and tags for a set of carefully selected civil unrest (CU) related keywords/terms, which are updated frequently. Each CU term is matched with the content of posts and tags. In a second filter 302 (i.e., location filter), location detection occurs for a set of pre-defined location terms covering major cities. Location references are searched within the content of posts and tags. In a third filter 304 (i.e., future date filter), the system according to the principles of the present invention searches the content of the posts and tags for word mentions of future dates. The system outputs social media blog posts that pass through all of the filters as candidates for potential civil unrest events at a future date 306. Since it is possible to have multiple posts regarding the same events, the posts are condensed and re-structured into a unified format prior to sending to the system analysts. An event is essentially defined by a triplet (civil unrest term, location, time). If several detected events share the same triplets, then they are assumed to be the same. Each component of the detection pipeline is described in detail below.

(4.1) Civil Unrest Terms Detection (Keyword Filter)

The first filter a Tumblr™ post needs to pass is a simple check for mention keywords (keyword filter). As a non-limiting example, a collection of thirty keywords believed to be substantially important and distinctive were manually defined to identify civil unrest events. Most of the pre-defined keywords are commonly used across Latin America regions, but among those were three Portuguese keywords used exclusively in Brazil. The following is an example set of keywords/terms used in the present invention: AnonymousBrasil, boicot, cacerolada, cacerolazo, huelga, marcha, Marchado, marcham, marchamos, marche, marché, marcho, Passeata, Protesta, protestam, protestarás, protestarem, protestarmos, proteste, protestemos, protesten, protesto, protestó, concentración, reforma, greve, rali, manifestação, manifestantes, corrupção.

Figure 7B:
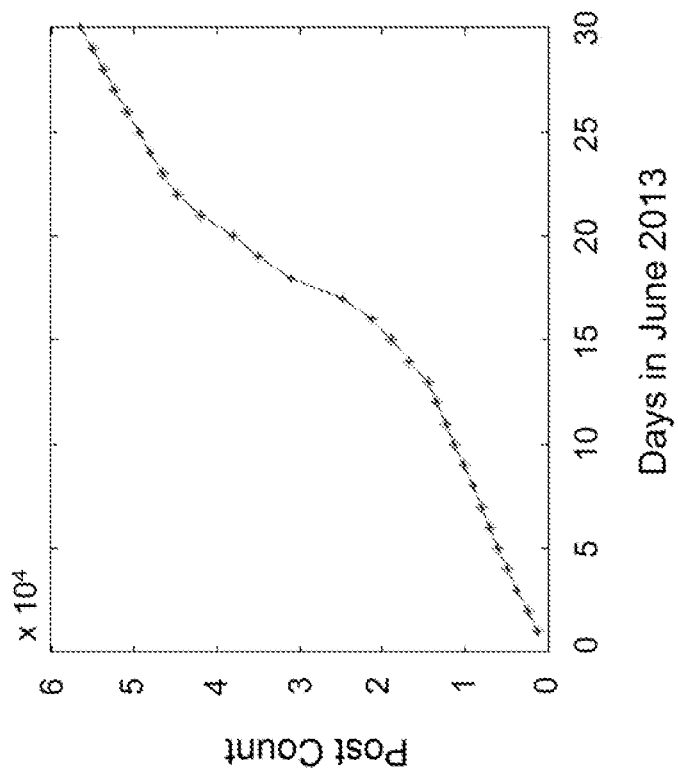
FIG. 7B illustrates cumulative new posts containing pre-defined keywords in June 2013 according to the principles of the present invention.
Figure 7A:
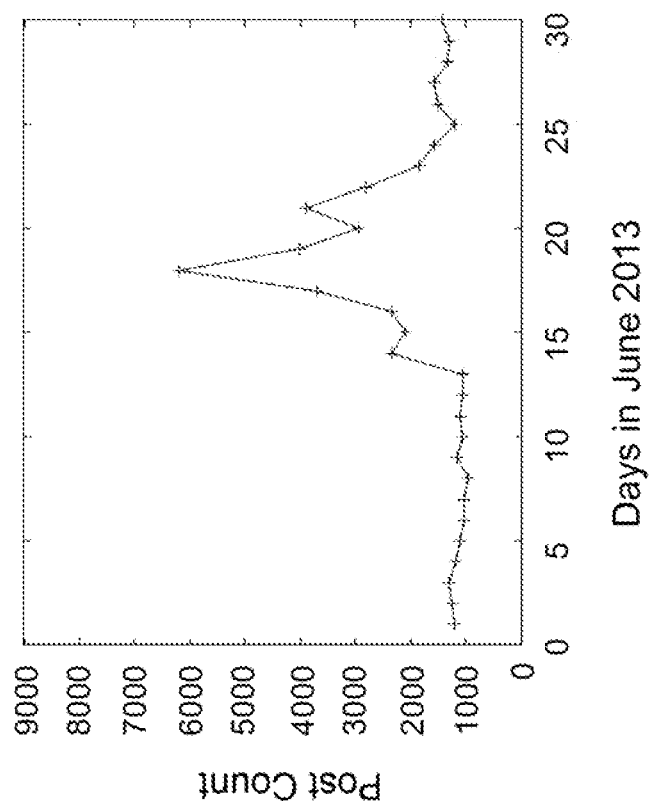
FIG. 7A illustrates a daily count of new posts which contain pre-defined keywords in June 2013 according to the principles of the present invention.

For each Tumblr™ post, the system searches the post's textual content for matches of any keywords. In addition, the system also scans through the hash tags section for matches. Note that hashtags are used to describe a post, and it is the only mechanism for information retrieval from the Tumblr™ website. A hashtag is a word or an unspaced phrase prefixed with the number sign ("#"). The underlying assumption for the keyword based filter is that related words will show an increase in usage when an event is emerging. Therefore, an event can be identified if related keywords show a burst in appearance count. For instance, FIG. 7A shows the daily count of new Tumblr™ posts which contain one or more pre-defined keywords in June 2013. FIG. 7B depicts cumulative new posts containing one or more pre-defined keywords in June 2013. A spike in the middle of the month (FIG. 7A) corresponds to the escalation of wide spread protests in Brazil during the time frame. The observed number of keyword mentions is 6 times more than the average keyword mentions in the earlier part of the month (FIG. 7B).

(4.2) Location Identification (Location Filter)

Location information is crucial for generating early warnings of civil unrest. This is because precautious actions can only be taken if the location of a civil unrest event is known in advance. In Twitter™ and several other micro-blogging platforms, geo-tags (i.e., associated global positioning system (GPS) coordinates in Tweets™) are supported. Based on a small portion of geo-tagged Tweets™/posts, location information of a majority of posts can be identified through friendship analysis (see Literature Reference No. 6). This is because a circle of friends is more likely to report nearby things or activities. However, unlike Twitter™, Tumblr™ does not provide any location-based tagging service. Thus, a different tactic is required to infer the location of a post where it is published.

Figure 4:
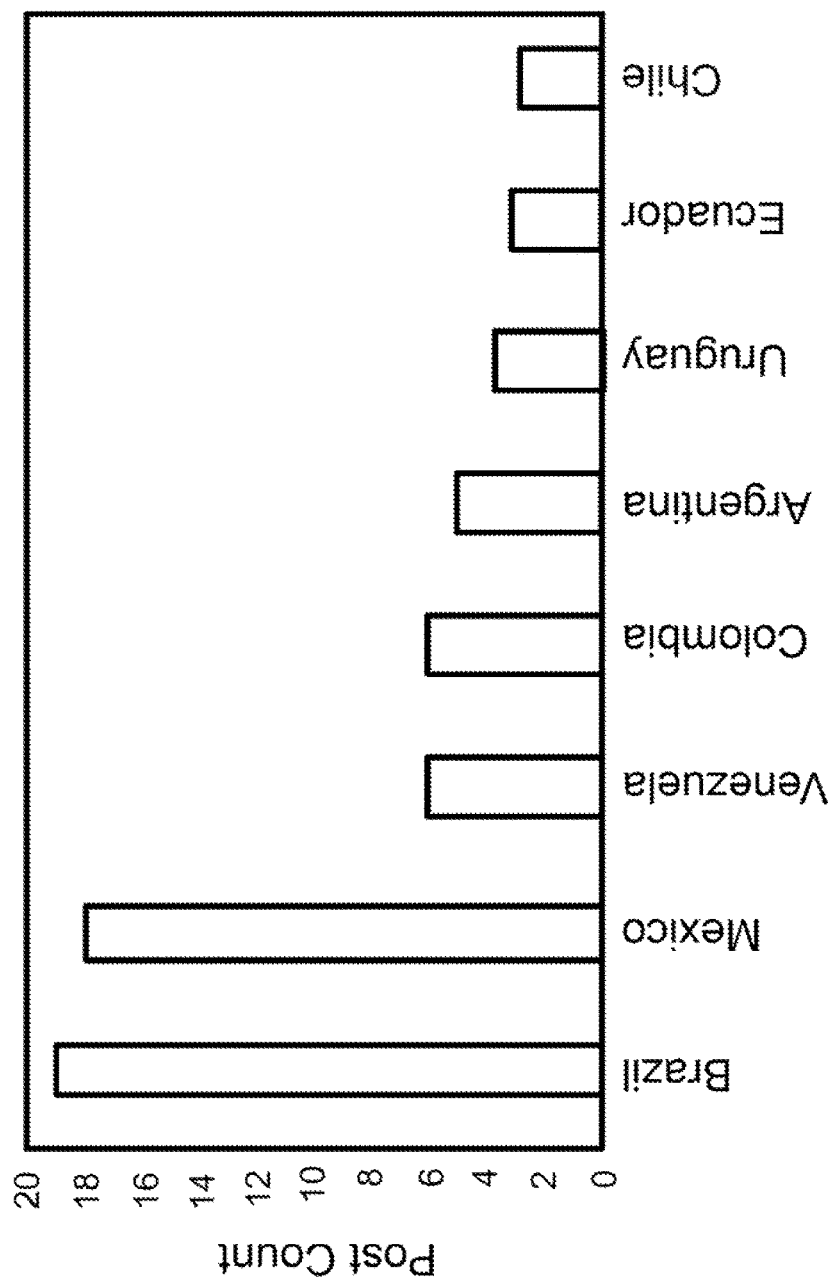
FIG. 4 is an illustration of the distribution of location terms by Latin American countries according to the principles of the present invention.

The text-based search approach is taken again, in which a set of pre-defined locations are matched against each Tumblr™ post. In this example, the list of locations consists of major cities of Latin America countries. The intuition is that major protests and strikes are more likely to occur in capital or major cities. A total of 64 different locations were defined. The distribution of these locations by countries (i.e., post count) is shown in the plot in FIG. 4. For each location, its full description is provided in the form of:

{Point of Interest (POI), City, State, Country}.

Depending on the matched terms from a post (if there are any), the system according to the principles of the present invention provides the best resolution of a location. The best resolution is determined by first trying to identify a city term. If a city term is not identified, then the system tries to identify a state term. If that is not successful, the system tries to identify a country term. A city term is considered the highest resolution. In addition to scanning for location terms within post content, the system also searches hashtags for potential matches. This is because a large portion of Tumblr™ posts contain images. When users assign tags to images, location information is among the top selections.

(4.3) Future Date Extraction (Future Date Filter)

Future date mentions extracted from social media posts are effective indicators of upcoming events. In addition, a future date is a necessary component for any meaningful forecast of civil unrest events. The future date filter operates a future date extraction code that searches first for month names and abbreviations in a selected language (e.g., Spanish, Portuguese), and second for numbers less than 31 within three whitespace separated tokens from each other. Thus, an example matching date pattern would be "11 de Abril". Four-digit years are quite rare in social media posts. In order to determine the year of the mentioned date, the year which minimizes the number of days between the mentioned date and the post's published time is used. For example, if a Tumblr™ post mentions "11 de Abril" on the date of 2013 Apr. 8, it is assumed that the user is talking about the future event on 2013 Apr. 11, as 2013 minimizes the difference in days between the published time and the mention time (i.e., compared to 2012). Once dates have been extracted from the text, it is asserted that the mentioned dates occur after the post published time. It is believed that posts mentioning past dates are unlikely to be indicative of future events. After the future date filter is applied, the number of posts remaining is reduced substantially. At this step, each Tumblr™ post which passes all three filters is considered a candidate of a civil unrest event on the mentioned date.

(4.4) Experimental Studies

A large scale experiment was conducted with the civil unrest detection system according to the principles of the present invention on Tumblr™ data. The data was obtained by purchasing a commercial real-time data feed consisting of 100% ("firehose" (i.e., a stream of complete social data)) Tumblr™ T posts. There are multiple content types found in Tumblr™ data, including text, images/photos, quotes, links, chats, audio, and video. In one aspect, the system according to the principles of the present invention focuses on analyzing text content and uses images to support visual description on an identified civil unrest event.

Figure 5B:
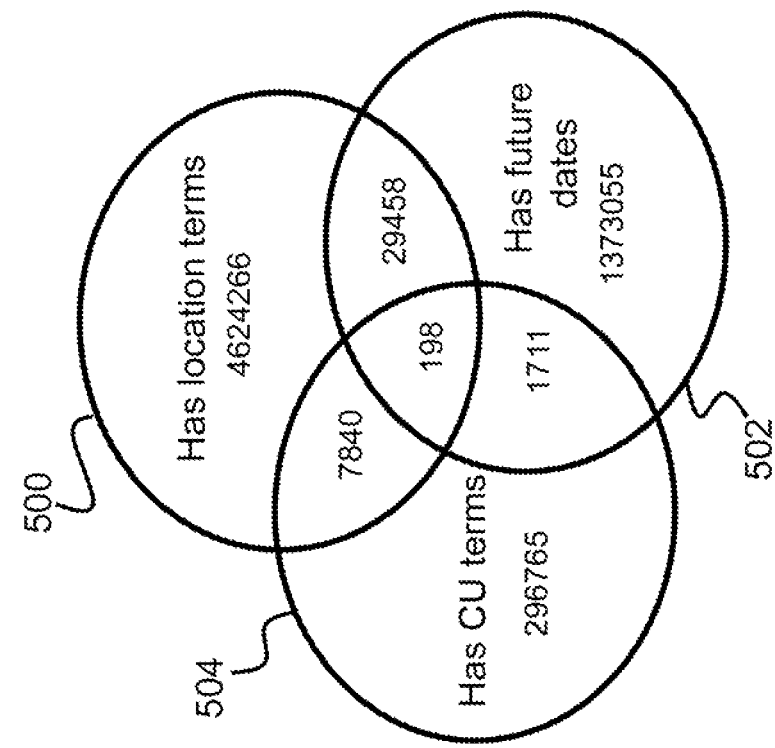
FIG. 5B is an illustration of resulting posts from a data feed from May 2013 that was passed through textual filters according to the principles of the present invention.
Figure 5A:
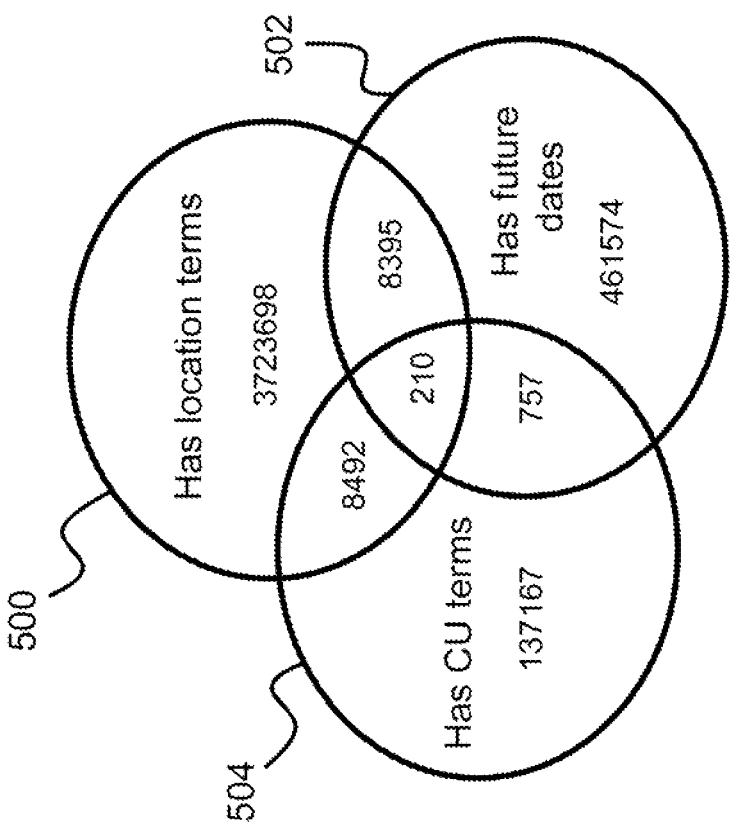
FIG. 5A is an illustration of resulting posts from a data feed from April 2013 that was passed through textual filters according to the principles of the present invention.

The purpose of the first experimental study was to get a good sense of the number of Tumblr™ posts which pass each of the filters. The study was carried out with the complete data feed from April and May of 2013. There were a total of 1,997,620,000 posts in April and 2,620,340,000 posts in May. The Venn diagrams illustrated in FIGS. 5A and 5B show the resulting posts from each filter for April and May, respectively, where CU denotes civil unrest. Each Venn diagram comprises a circle representing posts having location terms 500, a circle representing posts having future dates 502, and a circle representing posts having CU terms 504. As shown, the final number of detected civil unrest events (which lies in the overlapping part of the circles) is substantially smaller and more manageable compared to the original size of the input data. Note that depending on the applications, one can customize each filter to adjust the number of remaining posts for event forecast by, for instance, increasing or decreasing the number of domain keywords or locations.

Next, the accuracy of detected civil unrest posts was evaluated. This was done by comparing the system results with a GSR (Gold Standard Report), a monthly report provided by MITRE. The GSR is compiled manually by hand based on the reported civil unrest events in Latin America from major newspaper agencies. The table in FIG. 6 summarizes the performance of the system according to the principles of the present invention. Referring to the results for April, there were a total of 210 detected posts related to future civil unrest events. Out of those, 96% were considered correct as they could be matched to actual events in the GSR in terms of date and location of the event. There were a total of 80 unique posts; the other 130 posts were simply re-blogs (similar to a re-tweet in Twitter™) of the original posts and share identical contents. Out of the 80 unique posts, 91% (i.e., 73 posts) were considered correct, since they could be matched to the GSR. 48 of the correctly identified posts were published within the same date of the event, and 25 of the correct posts were published one or more days ahead of the actual event. Finally, the correct civil unrest related posts forecasted a total of 29 distinct GSR events in April. A similar interpretation was made for the May results.

As shown in the table in FIG. 6, it is possible to have multiple posts related to the same civil unrest event. Thus, it is important to assemble and condense the results before sending them to system analysts, since one does not want to send multiple warnings regarding the same event for analysis. For each detected post, the most relevant fields are extracted, such as event date, location, and visual description (if any), and packaged in a JavaScript Object Notation (JSON) format. Then, an automated scheme is developed to group all posts by dates and locations. As described above, the automated scheme is a procedure to check for duplicate event triplets (i.e., CU term, location, time). Posts with the same date and location are combined into one unified warning report.

In summary, social media has become a powerful tool for the organization of mass gatherings of all types. However, the massive volume of data makes it difficult to automatically extract valuable information in a timely fashion. The system according to the principles of the present invention can be used to detect upcoming civil unrest events based on a cascade of textual filters. Initial experiment on two months of Tumblr™ data showed promising results using the approach according to the principles of the present invention.

What is claimed is:

1. A social media mining system for early detection of events, the system comprising:
    one or more processors and a non-transitory computer-readable medium having executable instructions encoded thereon such that when executed, the one or more processors perform operations of:
    receiving, as input, a plurality of social media blog posts comprising textual data;
    processing the plurality of social media blog posts through a cascade of filters;
    wherein the cascade of filters comprises an event term detection filter, a location term detection filter following the event term detection filter, and a future date detection filter following the location term detection filter;
    searching the textual data for month terms, resulting in a set of social media blog posts comprising month terms;
    searching the set of social media blog posts comprising month terms for numbers less than 31, resulting in a set of social media blog posts comprising day terms;
    searching each social media blog post in the set of social media blog posts comprising day terms for a year which minimizes a number of days between a date mentioned in the social media blog post and a published date of the social media blog post, resulting in a set of social media blog posts comprising date terms;
    verifying that the date terms occur after published dates of the social media blog posts; and
    outputting a plurality of candidate social media blog posts describing an event of interest on a future date to a user for further analysis.

2. The social media mining system as set forth in claim 1, wherein the one or more processors further perform operations of using a set of user-defined keywords for the event term detection filter to match textual data in the plurality of social media blog posts with the set of user-defined keywords.

3. The social media mining system as set forth in claim 2, wherein the one or more processors further perform an operation of using a set of user-defined location terms for the location term detection filter to match textual data in the plurality of social media blog posts with the set of user-defined location terms.

4. The social media mining system as set forth in claim 1, wherein the one or more processors further perform an operation of customizing at least one of the event term detection filter, the location term detection filter, and the future date detection filter to adjust the number of the plurality of candidate social media blog posts describing the event of interest on the future date.

5. A computer-implemented method for early detection of events via social media mining, comprising:
    an act of causing a data processor to execute instructions stored on a non-transitory memory such that upon execution, one or more processors perform operations of:
    receiving, as input, a plurality of social media blog posts comprising textual data;
    processing the plurality of social media blog posts through a cascade of filters;
    wherein the cascade of filters comprises an event term detection filter, a location term detection filter following the event term detection filter, and a future date detection filter following the location term detection filter;
    searching the textual data for month terms, resulting in a set of social media blog posts comprising month terms;
    searching the set of social media blog posts comprising month terms for numbers less than 31, resulting in a set of social media blog posts comprising day terms;
    searching each social media blog post in the set of social media blog posts comprising day terms for a year which minimizes a number of days between a date mentioned in the social media blog post and a published date of the social media blog post, resulting in a set of social media blog posts comprising date terms;
    verifying that the date terms occur after published dates of the social media blog posts; and
    outputting a plurality of candidate social media blog posts describing an event of interest on a future date to a user for further analysis.

6. The method as set forth in claim 5, wherein the one or more processors perform operations of using a set of user-defined keywords for the event term detection filter to match textual data in the plurality of social media blog posts with the set of user-defined keywords.

7. The method as set forth in claim 6, wherein the one or more processors further perform an operation of using a set of user-defined location terms for the location term detection filter to match textual data in the plurality of social media blog posts with the set of user-defined location terms.

8. The method as set forth in claim 5, wherein the one or more processors further perform an operation of customizing at least one of the event term detection filter, the location term detection filter, and the future date detection filter to adjust the number of the plurality of candidate social media blog posts describing the event of interest on the future date.

9. A computer program product for early detection of events via social media mining, the computer program product comprising computer-readable instructions stored on a non-transitory computer-readable medium that are executable by a computer having a processor for causing the processor to perform operations of:

receiving, as input, a plurality of social media blog posts comprising textual data;

processing the plurality of social media blog posts through a cascade of filters;

wherein the cascade of filters comprises an event term detection filter, a location term detection filter following the event term detection filter, and a future date detection filter following the location term detection filter;

searching the textual data for month terms, resulting in a set of social media blog posts comprising month terms;

searching the set of social media blog posts comprising month terms for numbers less than 31, resulting in a set of social media blog posts comprising day terms;

searching each social media blog post in the set of social media blog posts comprising day terms for a year which minimizes a number of days between a date mentioned in the social media blog post and a published date of the social media blog post, resulting in a set of social media blog posts comprising date terms;

verifying that the date terms occur after published dates of the social media blog posts; and outputting a plurality of candidate social media blog posts describing an event of interest on a future date to a user for further analysis.

10. The computer program product as set forth in claim 9, further comprising instructions for causing the processor to perform operations of using a set of user-defined keywords for the event term detection filter to match textual data in the plurality of social media blog posts with the set of user-defined keywords.

11. The computer program product as set forth in claim 10, further comprising instructions for causing the processor to perform an operation of using a set of user-defined location terms for the location term detection filter to match textual data in the plurality of social media blog posts with the set of user-defined location terms.

12. The computer program product as set forth in claim 9, further comprising instructions for causing the processor to perform an operation of customizing at least one of the event term detection filter, the location term detection filter, and the future date detection filter to adjust the number of the plurality of candidate social media blog posts describing the event of interest on the future date.

13. A cascade of filters for early detection of events via social media mining, the cascade of filters comprising:

a first event term detection filter;

a second location term detection filter following the first event term detection filter; and a third future date detection filter following the second location term detection filter;

wherein the cascade of filters receives, as input, a plurality of social media blog posts comprising textual data;

wherein the cascade of filters sequentially processes the plurality of social media blog posts;

wherein the cascade of filters outputs a plurality of candidate social media blog posts describing an event of interest on a future date to a user for further analysis;

wherein the cascade of filters outputs a set of social media blog posts comprising month terms;

wherein the cascade of filters outputs a set of social media blog posts comprising day terms;

wherein the cascade of filters outputs a set of social media blog posts comprising date terms, wherein the set of social media blog posts comprising date terms are obtained by searching each social media blog post in the set of social media blog posts comprising day terms for a year which minimizes a number of days between a date mentioned in the social media blog post and a published date of the social media blog post;

wherein the date terms have been verified to occur after published dates of the social media blog posts; and wherein the cascade of filters is implemented as computer-readable instructions stored on a non-transitory computer-readable medium that are executable by a computer having a processor.

* * * * *